United States Patent [19]

Cruz

[11] Patent Number: 4,676,599
[45] Date of Patent: Jun. 30, 1987

[54] MICRO-OPTICAL LENS HOLDER

[75] Inventor: Emirto T. Cruz, Albuquerque, N. Mex.

[73] Assignee: The United States of America as represented by the Secretary of the Air Force, Washington, D.C.

[21] Appl. No.: 765,428

[22] Filed: Aug. 14, 1985

[51] Int. Cl.$^4$ .......................... G02B 7/02; B23B 31/00
[52] U.S. Cl. ........................ 350/252; 279/1 Q; 279/32
[58] Field of Search ............. 350/242, 252, 257, 357, 350/631; 279/1 B, 1 F, 1 Q, 32, 42, 48; 51/217 L; 269/217, 275, 900; 248/314, 316.2

[56] References Cited

U.S. PATENT DOCUMENTS

| 670,533 | 3/1901 | Byrd | 279/32 |
|---|---|---|---|
| 1,057,262 | 3/1913 | Oldfield | 350/252 |
| 1,258,621 | 3/1918 | Jenkins | 350/257 |
| 2,466,625 | 11/1947 | Ulmer | 350/278 |
| 2,695,787 | 11/1954 | Sunnen | 279/1 Q |
| 2,778,650 | 1/1957 | Benjamin et al. | 279/32 |
| 3,163,393 | 12/1964 | Strong, Jr. | 248/314 |
| 3,357,268 | 5/1964 | Richter | 74/89.15 |
| 3,433,219 | 9/1966 | Genevay | 128/76.5 |
| 3,749,479 | 7/1973 | Kempf | 350/252 |
| 3,837,759 | 9/1974 | Bittern | 279/1 B |
| 3,953,113 | 4/1976 | Shull | 350/288 |

FOREIGN PATENT DOCUMENTS

| 620036 | 10/1963 | Belgium | 350/631 |
|---|---|---|---|
| 2539640 | 3/1977 | Fed. Rep. of Germany | |

Primary Examiner—William H. Punter
Attorney, Agent, or Firm—Jacob N. Erlich; Donald J. Singer

[57] ABSTRACT

A micro-optical lens holder having a lens receiver movable within a collar. The lens receiver has an indentation therein in which the lens is placed and a longitudinally extending passageway for allowing light to pass through the lens. The collar circumscribes the lens receiver in such a manner that when the lens receiver is positioned within the collar, the collar exerts a force on the lens receiver to securely maintain the lens within the lens receiver. Lens replacement only requires the extraction of the lens receiver from the collar in order to replace the lens within the lens receiver with a lens of a different size.

8 Claims, 3 Drawing Figures

MICRO-OPTICAL LENS HOLDER

STATEMENT OF GOVERNMENT INTEREST

The invention described herein may be manufactured and used by or for the Government for governmental purposes without the payment of any royalty thereon.

BACKGROUND OF THE INVENTION

This invention relates generally to lenses, and, more particularly, to a uniquely designed small optical lens holder capable of easily permitting the replacement of the lens within the holder.

With the substantial use of optical systems requiring miniaturized lenses or micro-optical lenses therein, it has become increasingly necessary to provide a holder which enables such micro-optical lenses to be readily replaced therein. Many laboratory systems such as those involving the use of lasers or microscopic work require as part of the system micro-optical lenses of approximately 7-8 mm in diameter. In addition, with the miniaturization of cameras and photographic equipment it also becomes necessary to provide such small lenses in cameras, microscopes and other related optical devices. Heretofore, most miniaturized lens systems involved the use of lenses which were permanently contained within a cylindrical-type holder. It therefore became necessary when the replacement of such a lens was desired that the entire holder of the lens be replaced with another holder having the appropriate lens also permanently secured therein. Such a system created a large expense in maintaining a tremendous inventory of such lens/holder combinations. Furthermore, the storage space required for the numerous types of lens/holder combinations has been greatly increased with the increased requirement for a variety of lenses of different powers of magnification required in optical systems in use today.

It is therefore highly desirable to provide for a lens holder which is particularly suited to removably contain a lens therein, and, in particular, a micro-optical lens.

SUMMARY OF THE INVENTION

The present invention overcomes the problems encountered in the past and as set forth in detail hereinabove by providing a micro-optical lens holder which not only enables various lenses to be replaceable within the holder, but also enables high accuracy mounting of the lens within an optical system.

The lens holder of the present invention is made up of two major components, a substantially cylindrically-shaped collar and a lens receiver. In addition, if so desired, the lens collar may be mounted upon an adjustable stand for use within an optical system. More particularly, the lens receiver is designed of an elongated member being threaded at one end thereof and having a tapered housing portion at the other end thereof. Situated within the tapered housing portion is an indentation which can accommodate a lens therein which is preferably in the form of a micro-lens 7-8 mm in diameter. A plurality of longitudinal, circumferentially spaced apart slots are provided within the housing portion so as to enable the housing portion to have sufficient deflection capability. Consequently, the lens can be placed therein and securely held within the housing portion when the receiver is placed within the collar. In addition, a longitudinally extending aperture runs from the indentation which contains the lens therein completely through the threaded rear portion of the receiver so as to allow a light beam to pass therethrough when the lens is in place. A pair of small openings situated at the rear of the lens receiver adjacent the threaded end enables a tool to be inserted therein in order to screw or unscrew the receiver into or from the collar, respectively.

The collar is made up of a cylindrically-shaped annular member having a tapered interior, with one end portion thereof having internal threads capable of mating with the external threads on the lens receiver. The tapered housing portion of the lens receiver conforms to the interior taper of the collar such that when the lens receiver is screwed into the collar and the receiver is drawn rearward, the taper on the collar acts in a cam-like fashion to deflect the slotted housing portion of the receiver against the lens situated within the opening therein. In this manner the lens is securely held in place within the lens receiver.

When it is desirable to replace the lens, it is merely necessary to unscrew the lens receiver from the collar. This action releases the pressure on the housing portion and enables the lens to be withdrawn from the lens indentation. By having a light passageway or aperture pass through the entire length of the receiver the lens may be operable with a light beam being passed therethrough in either direction. The collar may be specifically manufactured so as to be used with any type of optical system, or, if desired, the collar may be of a plain external configuration and be adjustably mounted upon an optical stand.

It is therefore an object of this invention to provide a holder for micro-optical lenses.

It is another object of this invention to provide a micro-optical lens holder in which the lens contained therein can be readily replaced by various other types of lenses.

It is a further object of this invention to provide a micro-optical lens holder which finds utility when utilized in a number of different types of optical systems.

It is still a further object of this invention to provide a micro-optical lens holder which is economical to produce and which utilizes conventional, currently available components that lend themselves to standard mass producing manufacturing techniques.

For a better understanding of the present invention, together with other and further objects thereof, reference is made to the following description, taken in conjunction with the accompanying drawings and its scope will be pointed out in the appended claims.

DETAILED DESCRIPTION OF THE PREFERRED EMBODIMENT

Figure 1:
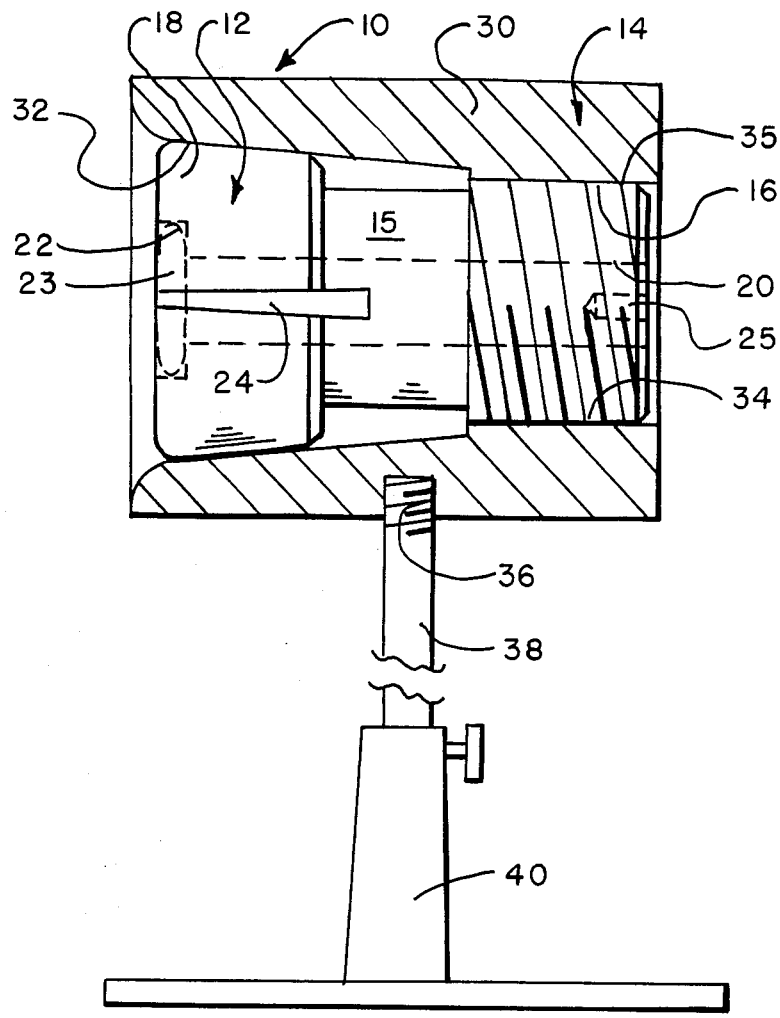
FIG. 1 is a side elevational view showing the micro-optical lens holder of the present invention partly in cross section.

Reference is now made to FIG. 1 of the drawings in which the micro-optical lens holder 10 of this invention is clearly illustrated in a partially cross sectioned view.

Figures 2, 3:
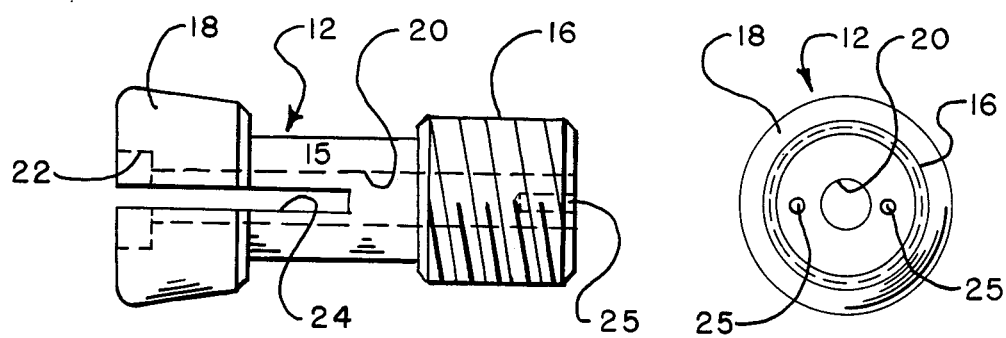
FIG. 2 is a side elevational view of the lens receiver of the micro-optical lens holder of the present invention.
FIG. 3 is an end view of the lens receiver of the micro-optical lens holder of the present invention.

As is evident from FIG. 1, lens holder 10 of the present invention is made up of two major components: (1) a lens receiver 12 and (2) a collar 14 which operably engages the lens receiver 12. More specifically, as shown in FIGS. 1-3 of the drawings, the lens receiver 12 is made up of a rod-shaped member or body 15 having external threads 16 at one end portion thereof and an enlarged tapered lens housing portion 18 at the other end thereof. A centrally located opening or passageway 20 is formed along the longitudinal axis of receiver 12 to allow the passage of light therethrough. In addition, a lens receiving indentation 22 is formed at the other end of housing 12 to accommodate any suitable sized lens 23. Although the exact dimensions of the lens 23 contained within the indentation 22 may vary within the scope of the present invention, it is preferable that such a lens indentation accommodate micro-optical lenses of between 7-8 mm in diameter.

Also formed within the housing portion 18 of receiver 12 are a plurality of longitudinally extending slots 24 (only one of which is shown in the drawings) spaced apart along the outer circumference of housing 18 so as to enable the housing portion 18 to have a small degree of deflection when subjected to an external force in a manner to be described in detail hereinbelow. The threaded portion 16 of body 15 of lens receiver 12 has a pair of small openings 25 situated therein to receive an apppropriate tool in order to rotate lens receiver 12 with respect to collar 14 so to enable lens receiver 12 to be secured within collar 14. Although not limited to the following dimensions, lens receiver 12 is generally approximately 1.5 inches in length with the housing portion 18 thereof approximately 0.31 inches in length and the threaded portion 16 approximately 0.5 inches in length. The largest external diameter of the tapered housing portion of receiver 12 is approximately 0.62 inches in diameter while the diameter of the threaded portion 16 is approximately 0.5 inches in diameter.

Reference is now made to collar 14 also shown in FIG. 1 of the drawings. It is clearly illustrated in FIG. 1 that this collar 14 is made of a substantially cylindrical, annular-shaped element 30 having a tapered interior configuration. More specifically, although not limited to the following dimensions, one end 32 of collar 14 has an internal diameter of approximately 0.69 inches while the other end 34 has internal threads 35 thereon and is of an inner diameter of approximately 0.5 inches so as to matingly engage with the external threads 16 of body 15 of receiver 12. The tapered interior configuration of collar 14 is designed so as to matingly engage with the tapered housing portion 18 of receiver 12. Upon insertion of receiver 12 so that threaded portions 16 and 35 are in threadable engagement with each other, pressure is applied to housing portion 18 by the tapered interior of collar 14 to create a deflection of housing portion 18. This deflection securely holds lens 23 in place. It is the longitudinal slots 24 located within housing portion 18 of receiver 12 which enables the deflection or springlike action to be increased as receiver 12 is threaded into collar 14.

In use, any suitable lens 23 such as a mirco-optical lens falling within the range of approximately 7-8 mm in diameter can be inserted within the indentation 22 within receiver 12. The receiver 12 is then threaded into the collar 14 in such a manner that the tapered interior portion of collar 14 engages the tapered exterior portion of housing 18 of receiver 12. Continued insertion of receiver 12 within collar 14 causes deflection of housing portion 18 to take place upon lens 23 in order to securely hold lens 23 within indentation 22. In this manner lens 23 is aligned with the longitudinal passageway 20 passing through receiver 12. If lens 23 is to be replaced, it is merely necessary to unscrew receiver 12 from collar 14. As receiver 12 is withdrawn from collar 14 housing portion 18 springs back to its original configuration and permits the release of lens 23 situated within indentation 22. In this manner a number of different sized lenses can be easily accommodated by receiver 12 so that holder 10 may be utilized in a number of different optical systems.

Although any suitable tool may be used in conjunction with holder 10 in order to rotate receiver 12 with respect to collar 14 it is preferable that a two pronged instrument be inserted within the appropriate openings 25. Once in position, the instrument can easily rotate receiver 12 within collar 14.

Although the external configuration of the collar 14 may vary in accordance with the use of lens holder 10, the exterior portion of collar 14 contains a threaded opening 36 therein which is used to threadably engage an adjustable rod 38 situated within a conventional optical stand 40. In this manner the micro-optical lens holder 10 of the present invention can be readily utilized within any type of optical system in which it is desirable to use a wide range of different sized optical lenses.

Although this invention has been described with reference to a particular embodiment, it will be understood that this invention is also capable of further and other embodiments within the spirit and scope of the appended claims.

I claim:
1. A lens holder comprising:
   (a) an elongated member, said elongated member having
      an indentation in one end thereof for removably receiving a lens therein.
      a longitudinally extending passageway therethrough interconnected at one end thereof with said indentation, said passageway being in optical alignment with said lens located within said indentation,
      a plurality of longitudinally extending, circumferentially spaced apart slots adjacent said indentation, and
      a threaded exterior portion adjacent the other end thereof; and
   (b) means circumscribing said elongated member for maintaining said lens within said indentation, said lens maintaining means having a tapered interior opening therethrough, with one end thereof engaaging said elongated member adjacent said slots, and
      said lens maintaining means having a threaded interior portion for matingly engaging said threaded exterior portion of said elongated member;
   whereby said lens may be easily replaced within said lens holder with a different lens.
2. A lens holder as defined in claim 1 wherein said elongated member has a pair of openings adjacent an end thereof for receiving a tool capable of rotating said elongated member within said lens maintaining means.
3. A lens holder as defined in claim 2 wherein said elongated member has a tapered housing portion encompassing said indentation, said tapered housing por- tion matingly engaging said tapered interior of said lens maintaining means in a cam-like fashion.

4. A lens holder as defined in claim 3 wherein said lens maintaining means is in the form of a collar having a threaded opening on an exterior wall thereof for operably engaging an optical stand.

5. A lens holder as defined in claim 4 further comprising an optical stand, said optical stand being interconnected to said collar by said threaded opening.

6. A lens holder comprising:
a substantially cylindrically shaped body portion having a taper at one end thereof and being of a preselected external diameter and having a threaded portion at the other end thereof of a preselected external diameter less than said preselected external diameter of said tapered portion, a longitudinally extending passageway formed through the entire length of said body, an indentation situated at one end of said passageway within said tapered portion of said body for receiving a lens therein, and a plurality of longitudinally extending, circumferentially spaced apart slots situated within said tapered portion of said body to allow deflection of said tapered portion of said body to take place about said indentation; and a collar, said collar being of substantially cylindrical configuration and having an internal passageway therein, said internal passageway having a tapered preselected internal diameter at one end thereof and a preselected internal diameter at the other end thereof as well as having internal threads therein;

whereby said body containing a lens therein can threadably engage with said collar and wherein said tapered internal passageway of said collar exerts a pressure on said tapered portion of said body in order to secure said lens within said indentation of said body.

7. A lens holder as defined in claim 6 wherein said body has a pair of openings adjacent an end thereof for receiving a tool capable of rotating said body within said collar.

8. A lens holder as defined in claim 7 further comprising an optical stand, said optical stand being interconnected to said collar.

* * * * *